US008528789B2

(12) United States Patent
Ramsey et al.

(10) Patent No.: US 8,528,789 B2
(45) Date of Patent: Sep. 10, 2013

(54) SEMI-CIRCULAR LIQUID DISPENSER WITH A ROTATABLE CASING

(75) Inventors: Louise Ramsey, Skelmersdale (GB); Peter Ramsey, Skelmersdale (GB)

(73) Assignee: TIPRC Limited, Skelmensdale (GB)

( * ) Notice: Subject to any disclaimer, the term of this patent is extended or adjusted under 35 U.S.C. 154(b) by 350 days.

(21) Appl. No.: 12/665,737

(22) PCT Filed: Jun. 20, 2008

(86) PCT No.: PCT/GB2008/002109
§ 371 (c)(1),
(2), (4) Date: May 11, 2010

(87) PCT Pub. No.: WO2008/155553
PCT Pub. Date: Dec. 24, 2008

(65) Prior Publication Data

US 2010/0282779 A1 Nov. 11, 2010

(30) Foreign Application Priority Data

Jun. 20, 2007 (GB) .................................. 0711893.8

(51) Int. Cl.
*B67D 7/06* (2010.01)
*B65D 88/54* (2006.01)
*G01F 11/00* (2006.01)

(52) U.S. Cl.
USPC ......................... 222/182; 222/183; 222/321.1

(58) Field of Classification Search
USPC ................ 222/182, 183, 321.1, 321.7, 321.9, 222/175, 558
See application file for complete search history.

(56) References Cited

U.S. PATENT DOCUMENTS

| | | | | |
|---|---|---|---|---|
| 829,327 | A * | 8/1906 | Crisp | 15/425 |
| 2,276,047 | A * | 3/1942 | Kurth | 401/88 |

(Continued)

FOREIGN PATENT DOCUMENTS

| | | | |
|---|---|---|---|
| EP | 1 057 536 | A | 12/2000 |
| JP | 2002 034643 | A | 2/2002 |

(Continued)

OTHER PUBLICATIONS

United States Patent and Trademark Office, A Guide to Filing a Design Patent Application, Sep. 16, 2003, p. 14 (p. 17 including covers). <http://www.uspto.gov/web/offices/com/iip/pdf/brochure_05.pdf>.*

*Primary Examiner* — Paul R Durand
*Assistant Examiner* — Matthew Lembo
(74) *Attorney, Agent, or Firm* — Defillo & Associates, Inc.; Evelyn A. Defillo

(57) ABSTRACT

A container for a liquid, in particular, a high-value liquid in a small quantity such as a perfume is disclosed. The container comprises a reservoir (12) within which a liquid can be contained. A dispenser (24), typically a pump dispenser, is carried on a neck (20) of a filling opening of the reservoir (12) thereby sealing the reservoir. The dispenser can dispense a quantity of liquid from the reservoir (12) on operation of a trigger. A casing (32) is also carried on the reservoir (12). The casing (32) and the reservoir (12) can be mutually rotated between a closed condition and an open condition. In the closed condition, the casing prevents access to the trigger and the reservoir predominantly projects from the casing, and in the open condition, the trigger can be operated and the reservoir (12) is substantially received within the casing (32).

18 Claims, 7 Drawing Sheets

(56) References Cited

U.S. PATENT DOCUMENTS

| | | | | | |
|---|---|---|---|---|---|
| D189,076 | S | * | 10/1960 | Altman | D24/110 |
| 4,051,983 | A | * | 10/1977 | Anderson | 222/321.2 |
| 4,140,249 | A | * | 2/1979 | Majima | 222/321.2 |
| D314,511 | S | * | 2/1991 | Dinand | D9/571 |
| 5,377,842 | A | | 1/1995 | Sorini | |
| 5,482,187 | A | * | 1/1996 | Poulsen et al. | 222/207 |
| 5,492,248 | A | | 2/1996 | Ortner | |
| 5,833,093 | A | | 11/1998 | Honaker et al. | |
| 6,016,916 | A | * | 1/2000 | Ortner | 206/581 |
| D428,340 | S | * | 7/2000 | Herrmann | D9/739 |
| D471,086 | S | * | 3/2003 | Helleu | D9/694 |
| 7,195,414 | B2 | * | 3/2007 | Altonen et al. | 401/190 |
| D568,692 | S | * | 5/2008 | Lam | D7/629 |
| 7,552,728 | B2 | * | 6/2009 | Bonney et al. | 128/200.14 |
| D626,007 | S | * | 10/2010 | Mouquet | D9/694 |
| 7,886,395 | B2 | * | 2/2011 | Farnworth et al. | 15/105.53 |
| 2006/0157511 | A1 | * | 7/2006 | Do Rosario et al. | 222/183 |
| 2007/0075102 | A1 | | 4/2007 | Moore | |

FOREIGN PATENT DOCUMENTS

| | | | | |
|---|---|---|---|---|
| JP | 2002034643 | A | * | 2/2002 |
| JP | 2003207151 | | | 7/2003 |
| NL | 9 301 506 | A | | 4/1995 |
| WO | WO 2004/002855 | A | | 1/2004 |

* cited by examiner

SEMI-CIRCULAR LIQUID DISPENSER WITH A ROTATABLE CASING

CROSS REFERENCE TO RELATED APPLICATION

This application is a national stage entry of PCT/GB2008/002109 filed Jun. 20, 2008, under the International Convention claiming priority over GB Application No. 0711893.8 filed Jun. 20, 2007.

BACKGROUND TO THE INVENTION

This invention relates to a container for a liquid. In particular, it relates to a container for a small amount of liquid of high value, such as perfume for personal use.

FIELD OF THE INVENTION

There are several situations in which a small amount of liquid must be packed in a secure and attractive manner. An example is perfume for personal use. When a new perfume is introduced, manufacturers often distribute small samples. This is particularly applicable to perfume of high value, where a potential customer is wary of incurring the cost of a normal-sized bottle of the perfume until there is no doubt in their mind that the perfume meets their expectations. Additionally, it is sometimes desirable to carry a small amount of perfume during the day in circumstances where carrying a full-size bottle may be inconvenient or impracticable.

Another application that has recently become more important is providing a vessel that a person can take onto an aircraft that complies with security regulations that relate to carriage of liquids. In many situations the amount of liquid that can be carried by a passenger boarding an aircraft is limited in volume, and security authorities may wish to inspect the liquid visually.

SUMMARY OF THE INVENTION

An aim of the invention is to provide a container for packaging a small volume of a liquid product in an attractive and convenient manner, and such that the contents can be inspected from outside of the container, and which can have an appearance that is sufficiently attractive that the container can be worn about the person and have the appearance of a decorative article such as an item of jewelry.

From a first aspect, this invention provides a container for a liquid comprising:

- a dispenser carried on the reservoir that can dispense a quantity of liquid from the reservoir on operation of a trigger,
- a casing carried on the reservoir; in which
- the casing and the reservoir can be mutually rotated between a closed condition and an open condition:
- in the closed condition the casing prevents access to the trigger and the reservoir predominantly projects from the casing, and
- in the open condition the trigger can be operated and the reservoir is substantially received within the casing.

Advantageously, the reservoir includes at least one wall of a transparent or a semi-transparent material, through which the contents of the reservoir can be inspected when the container is in the closed condition. Alternatively, the reservoir may be made entirely of transparent material. This can facilitate inspection by security personnel. As a further alternative, the reservoir may be opaque or semi-transparent to allow its external appearance to be completely controlled.

When in the closed condition, the container may present an approximately circular in peripheral shape.

In typical embodiments, the dispenser is a trigger-operated pump. Advantageously, it is a metered-dispense type pump. Alternatively, the reservoir may be suitable for containing a liquid product and a propellant gas under pressure, and the dispenser includes a valve and a spray head. That is, the container may be a so-called aerosol.

Detents may be provided to retain the container in its open and/or its closed condition.

The invention may also provide a container in combination with a plurality of mounting components, any of which can be releasably connected to the container, the mounting components being suitable for connection with a garment.

In a first configuration, the dispenser is permanently attached to the container. This prevents the reservoir being re-filled, as may be desirable if a manufacturer for distribution of a sample of a product brands the container. In an alternative configuration, the dispenser is releasably attached to the container, for example by a screw thread. A user can remove the dispenser to fill and re-fill the reservoir. This allows the container to be used to carry a small amount of liquid of a user's choice.

From a second aspect, the invention provides a packaged product comprising a container embodying the first aspect of the invention with a liquid product contained within its reservoir.

The volume of liquid within the container is typically less than 100 ml, and more typically less than 50 ml. For example, it may be 5 ml, 10 ml or 15 ml.

The liquid may be a product for personal use such as a perfume. Alternative examples of products include eau-de-toilette, cologne aftershave, cosmetics, a skincare preparation, a toiletry, a hair lotions or hair care preparation; a toilet preparation; a shaving preparations e.g., after-shave lotion, a beauty preparation, a dentifrice, an essential oil, a deodorant, an anti-perspirants, a sun-tan or sun-screening preparation, a depilatory preparation; a lotions, a massage oils, nail polish, nail polish remover, soap or shampoo, a preparations for the conditioning, care and appearance of the skin, body, face, eyes, hair, teeth and nails; a shower or a bath preparations, a bath oil, a moisturisers, an aromatherapy preparation, a baby oil, a room fragrance, a cleaning or polishing preparation, or a liquid pharmaceutical product.

DETAILED DESCRIPTION OF THE PREFERRED EMBODIMENTS

Figure 1:
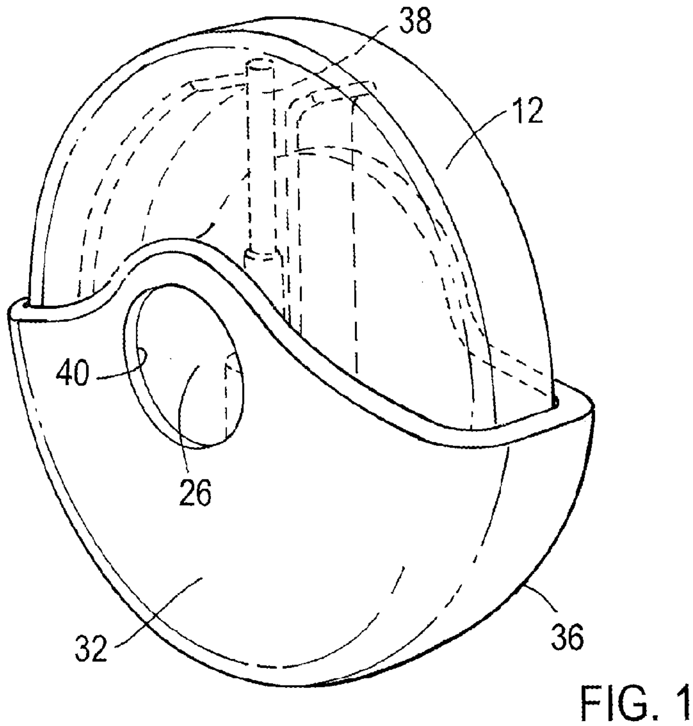
FIGS. 1 and 2 are perspective and front views of a first embodiment of the invention in a closed condition.

With reference to the drawings, a first embodiment of the invention is a container for 5 ml of a liquid such as a perfume or other composition for personal use.

The container comprises a reservoir 10 in which a liquid can be contained. The reservoir has parallel spaced front and rear walls 12, 14. Each of the front and rear walls 12, 14 have an arcuate peripheral region that is shaped as a segment of a circle extending slightly more than 180°. The remainder of the periphery of the front and rear walls 12, 14 is slightly convex. The front and rear walls 12, 14 are mirror-symmetric about a centre axis. To complete the reservoir 10, the front and rear walls 12, 14 are interconnected around their periphery by a side wall 16, which likewise has an arcuate region and a convex region. In this embodiment, the reservoir is formed from two mouldings that are interconnected by welding, with the side wall 16 being formed substantially equally by both of the mouldings.

Each of the front and rear walls 12, 14 carries a respective projecting boss 26. The bosses have a circular periphery are coaxial. A tab 28 projects from the rear wall 14

The reservoir 10 has a neck 20 through which liquid can pass into and out of an internal space of the reservoir 10. The neck 20 extends from a central region of the side wall at the mid-point of the convex region of the side wall 16. The neck 20 has engagement formations 22 that allow it to be interconnected with a dispenser 24. The passage through the neck has a central axis.

Figure 2:
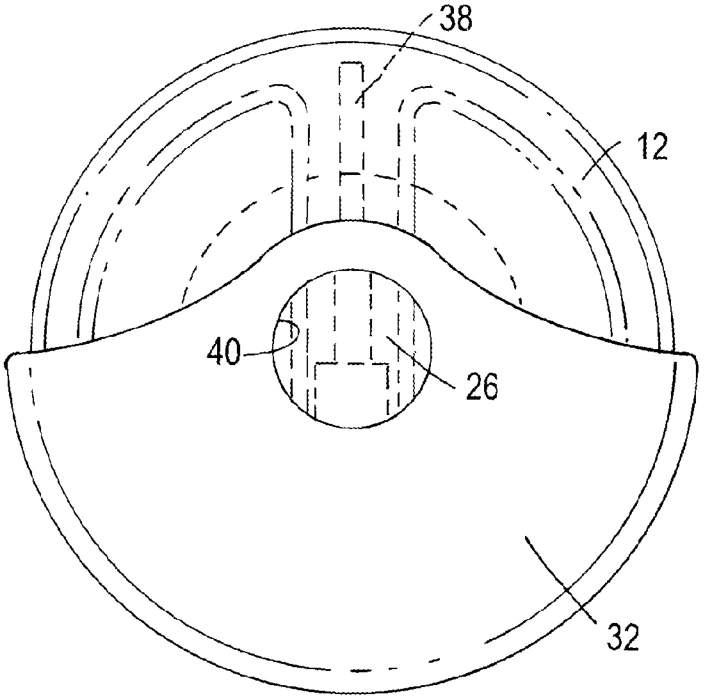
Figure 3:
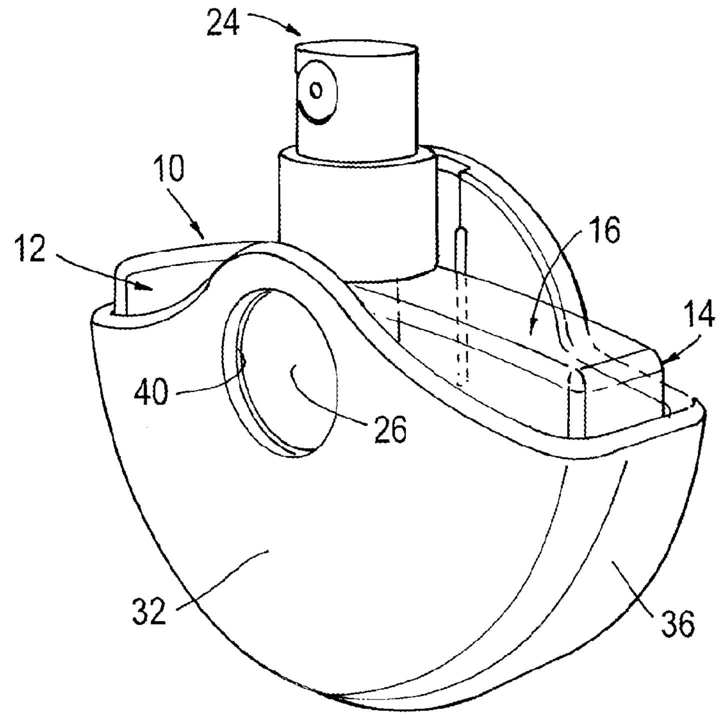
FIGS. 3 and 4 are perspective and front views of a first embodiment of the invention in an open condition.
Figure 4:
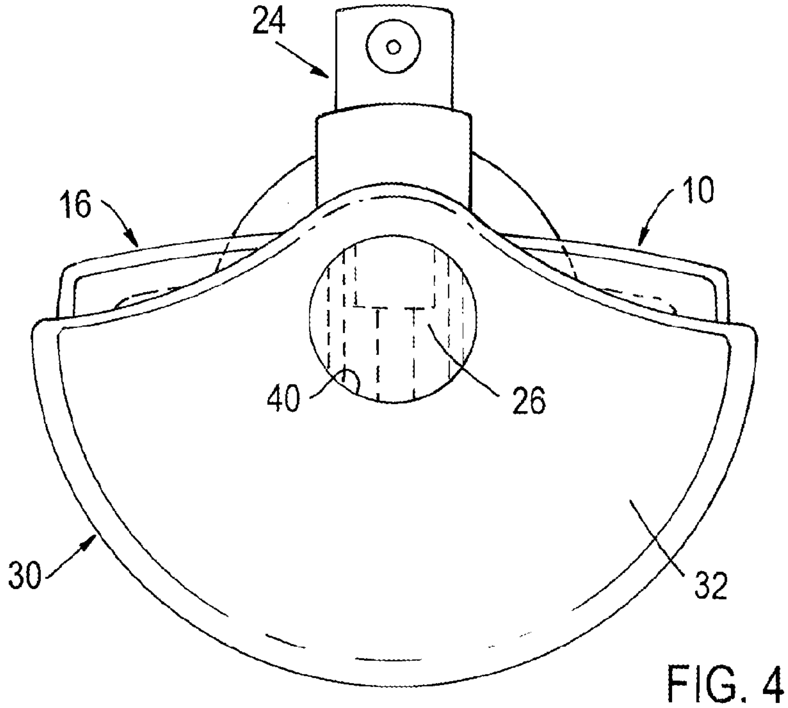
Figure 5:
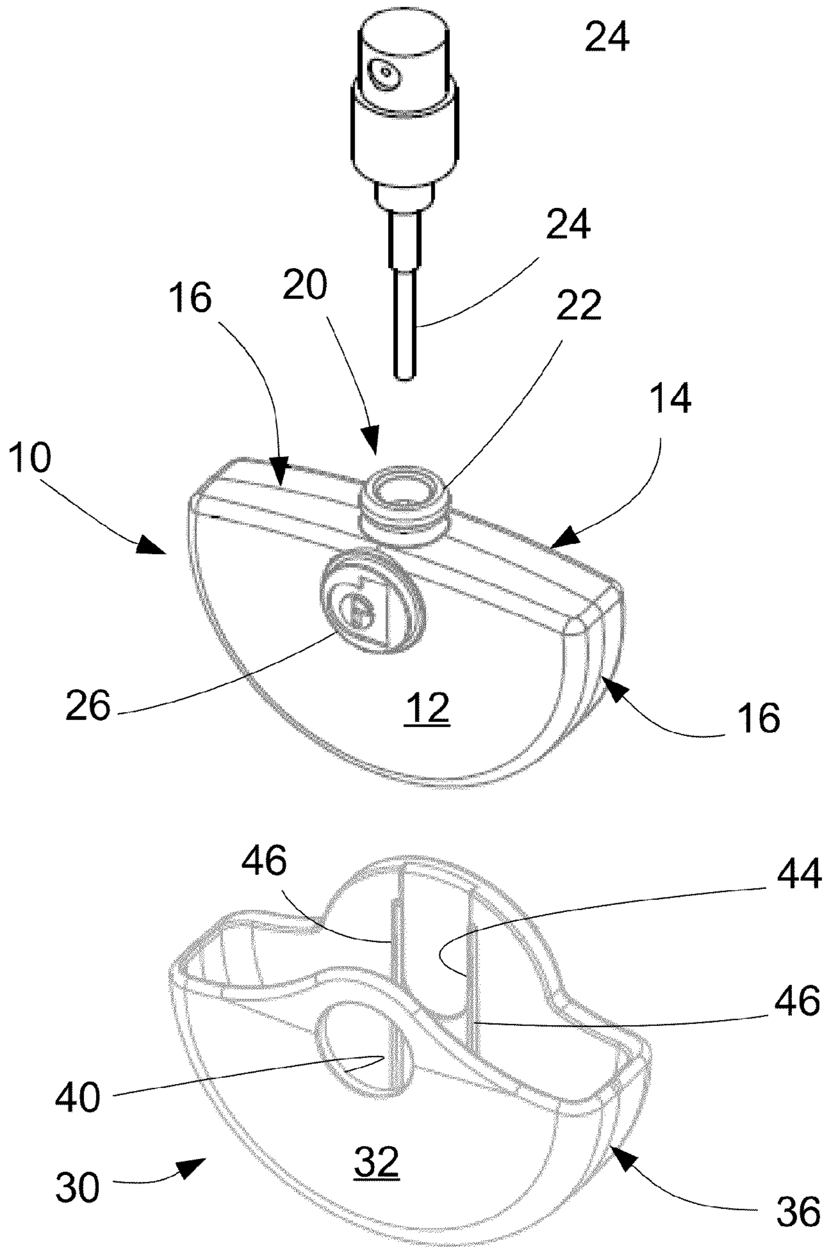
FIG. 5 is an exploded view of the embodiment of FIG. 1.
Figure 6:
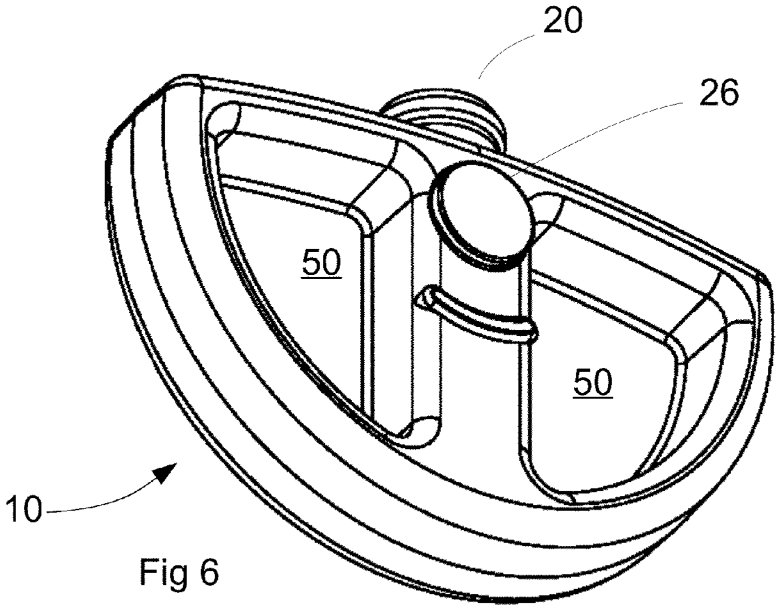
FIG. 6 is a rear perspective view of a reservoir of the embodiment of FIG. 1.

In this embodiment, the dispenser 24 is a metered-dispense finger-operated pump dispenser with a dose of 0.05 $mm^3$. It has a pump body that is carried on the engagement formations 22 of the neck 20, on which it is a snap fit where the intention is that the container is not to be refilled. A seal is formed between the dispenser 24 and the neck, so the dispenser 24 acts as a sealing closure for the reservoir 10. A dip tube 38 extends into the reservoir 10 to pick up liquid contained within it when the container is in the deployed condition. When being carried in the closed condition, the dip tube 38 may extend upwardly, and therefore not be submerged in the liquid, as shown in FIGS. 1 and 2. A trigger projects from the pump body in a direction axially away from the reservoir. Since the dispenser, in this embodiment, is a component that can be obtained as a matter of routine, it will not be described here further.

As an alternative, the dispenser may be engaged on the neck with a screw thread. This allows it to be readily removed so that the reservoir can be re-filled. This allows the container to be used as a convenient way to carry a small amount of a liquid of choice. For example, a small amount of perfume can be carried for application during the day, while it would not be convenient to carry a full-size bottle of perfume.

The container further includes a casing 30. The casing has parallel, spaced front and rear walls 32, 34 and a peripheral wall 36. The spacing between the front and back walls 32, 34 is such that the reservoir 10 is a sliding fit between them with slight clearance, an outer surface of the front wall of the reservoir 10 being adjacent to an inner face of the front wall of the casing 30 and an outer surface of the rear wall of the reservoir 10 being adjacent to an inner face of the rear wall of the casing 30. An arcuate region of the periphery of the front and rear walls of the casing has a similar angular extent and a slightly larger radius than the arcuate peripheral region of the reservoir 10. The remainder of the periphery of the front and rear walls of the casing 30 are convex, but of different shapes, as will be described in more detail below. The arcuate parts of the peripheries of the front and rear walls of the casing 30 are interconnected by a side wall, and the space between the convex regions of the front and rear walls is an open slot. Thus, the reservoir can pass into the casing 30 through the open slot.

The front wall 32 of the casing 30 has a circular aperture 40 at a region that is central of the arcuate region of its periphery. The aperture of the diameter is slightly greater than the diameter of the boss 26 of the reservoir 10. The convex region of the front wall 32 is shaped as a bell curve, with a portion projecting to provide sufficient material to surround the aperture 40. (The particular shape is a matter of aesthetic choice, provided that there is sufficient material surrounding the aperture 40 to confer for strength.)

The rear wall 34 of the casing 30 has a shape that is broadly similar in profile to the front wall 32, but with a more-pronounced central projection in the convex region. A slot 44 is formed in an inner surface of the rear wall 34, being of depth approximately half the thickness of the rear wall 34 and width substantially the same as the diameter of the aperture 40 in the front wall 32. The slot 44 extends from an edge of the rear wall 34 centrally of the projecting of the convex region, and ends opposite the aperture 40. At its inner end region, the slot 44 has a semi-circular end wall of substantially the same radius as that of the aperture 40. A respective rib 46 extends parallel to and spaced from each side of the slot 44.

To assemble the container, the reservoir 10 is introduced into the casing 30. The boss 26 of the rear wall 14 of the reservoir 10 slides into the slot 44 in the rear wall 34 of the casing 30. The front wall 32 of the casing is deflected away from the rear wall 34 to allow the boss 26 on the front wall 12 of the reservoir 10 to pass behind it. The boss 26 then enters the aperture 40 in the front wall 32, and the front wall 32 is allowed to return from its deflected condition to a natural condition.

Thus assembled, the following should be noted about the container:

the reservoir 10 and the casing 30 can rotate with respect to one another about an axis that is transverse to the axis of the neck by pivoting about the bosses 26;

the periphery of the aperture 40 and the semi-circular end wall of the slot act as surfaces against which the apertures can pivot;

separation of the casing 30 from the reservoir 10 is resisted because one boss 26 is retained within the aperture 40; and the boss 26 is visible from outside of the container through the aperture 40, so it may carry indicia, such as a manufacturers trade mark.

To place the container in a fully-open condition, the casing 30 is manually rotated to completely expose the trigger. The trigger will typically be pointed upwards for use so that the dip tube extends downwardly into the liquid). To reach this condition, the tab 28 must pass one or other rib 46. The position and size of the tab 28 and the ribs 46 is selected such that resistance to the rotational movement occurs as the tab 28 passes the rib, and when the container is fully open, the tab 28 rests between the ribs 46. Thus, the tab 28 and the ribs 46 act as a detent to locate the container in the open condition.

The container is fully closed when the casing 30 and the reservoir are rotated 180° from the open condition described above about the bosses 26—that is, about an axis that is transverse to the axis of the neck 20. In the fully-closed condition, the trigger of the dispenser 24 is entirely enclosed within the casing 30. However, the reservoir 10 projects from the casing, which (providing it is made of as suitable transparent material) allows its contents to be inspected. In this condition, the tab 28 rests between the ribs 44 (not at the same place as in the open condition, but displaced along their length), so that the tab 28 and the ribs 46 also act as a detent to locate the container in the closed condition.

The reservoir 10 is made of a transparent plastic material, which optionally has a coloured tint. For the user of the container, this has the advantage that the amount contained within it can be seen. It also allows the contents to be inspected, for example, by airport security officials.

Figure 7:
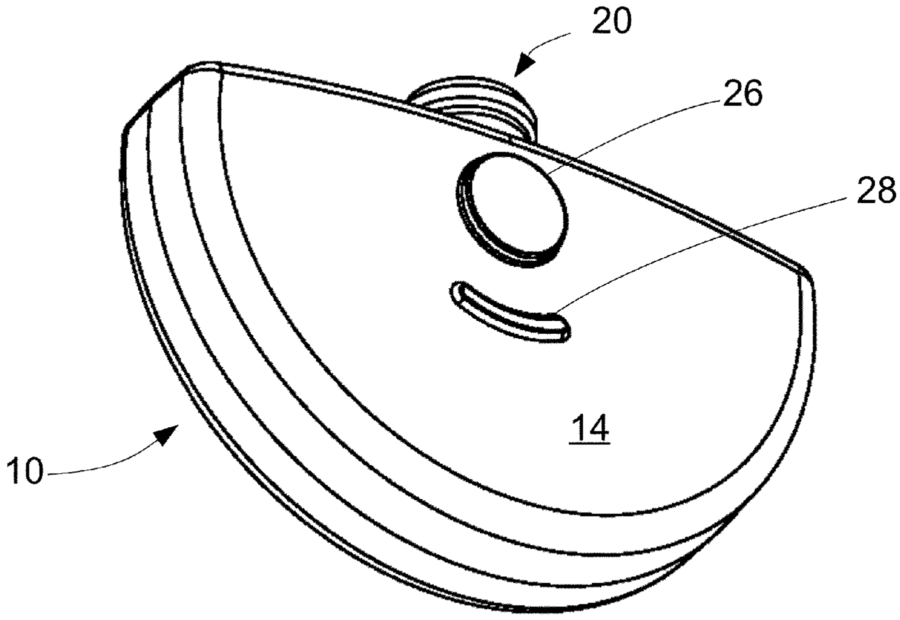
FIG. 7 is a rear perspective view of a reservoir of a first alternative embodiment.
Figure 8:
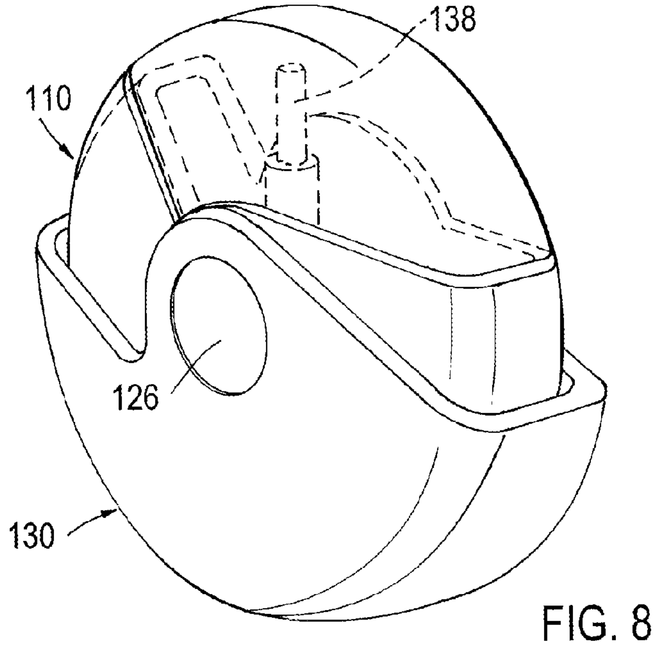
FIGS. 8 and 9 are perspective front and rear views of a second embodiment of the invention in a closed condition.

The rear wall of the reservoir contains recesses 50 that project into the reservoir such that its internal volume is substantially filled when the intended volume of liquid (5 ml) is introduced into it. In a first alternative embodiment, the recesses are omitted (as shown in FIG. 7) to provide a container for a larger volume of liquid. For example, the dimensions of the reservoir 10 and the recesses may be such that a container for 10 ml of liquid is obtained by omission of the recesses; all other components can remain unchanged. Containers with larger volumes can be obtained by scaling the container in size.

Figure 9:
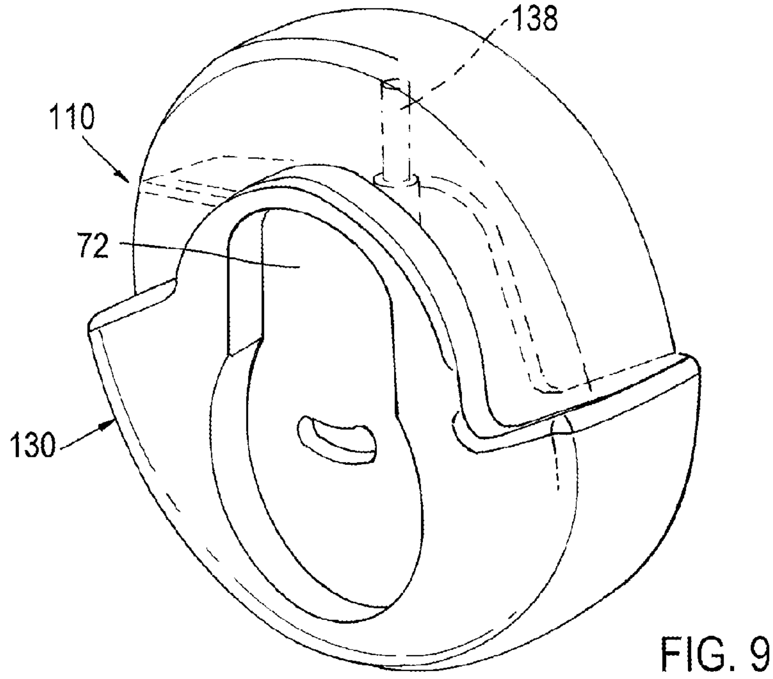
Figure 10:
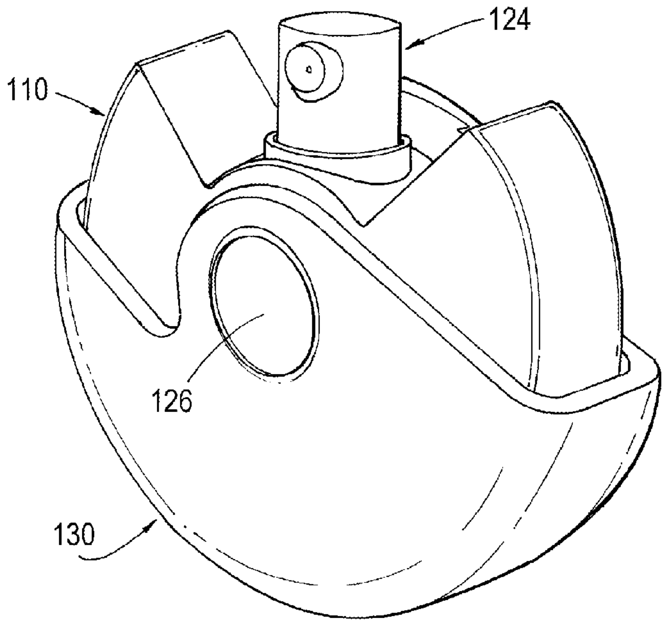
FIG. 10 is a perspective front view of a second embodiment of the invention in an open condition.
Figure 11:
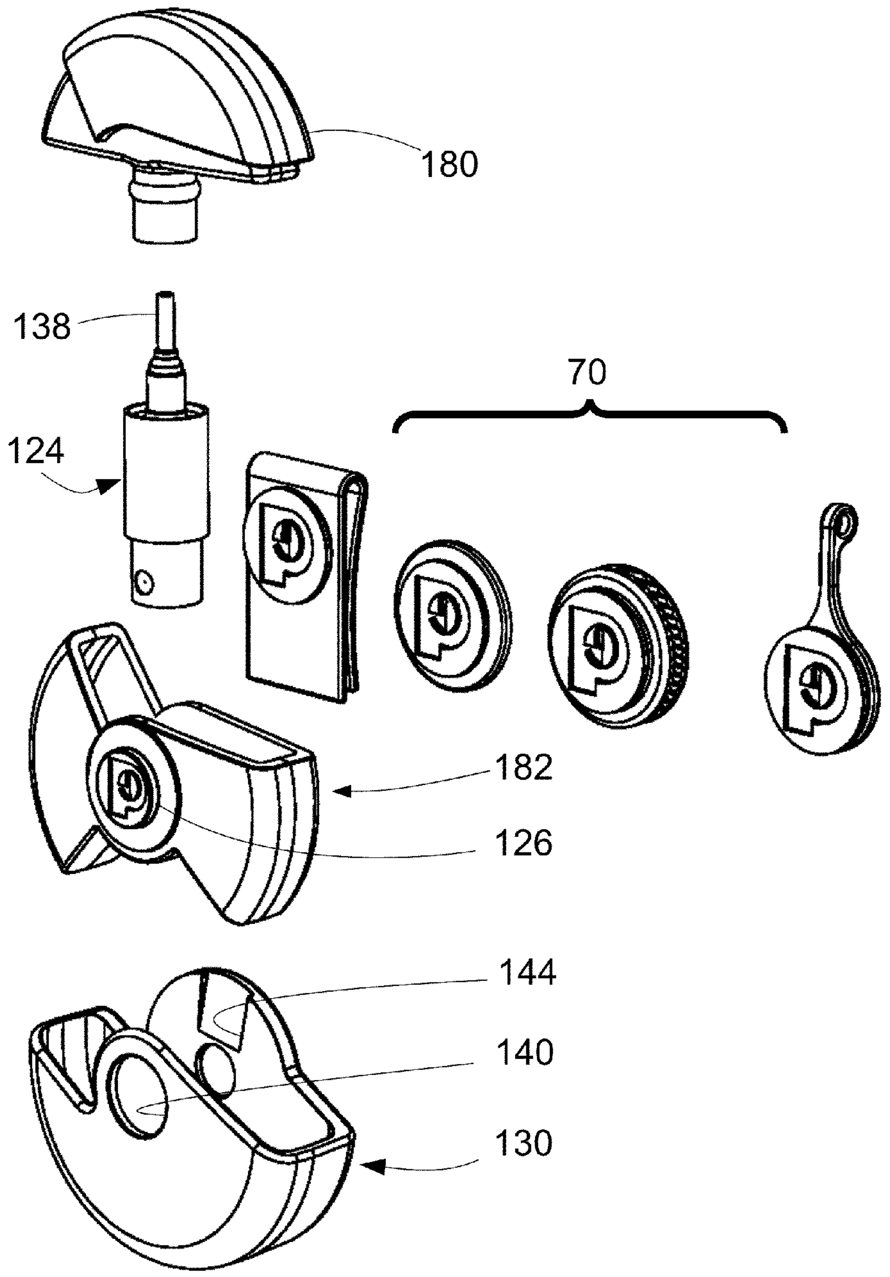
FIG. 11 is an exploded view of the embodiment of FIG. 8.

An alternative embodiment will now be described with reference to FIGS. 9 to 11. Where components of this embodiment are similar to those of the first embodiment, they will be given a reference numeral of 100 plus that used in the description of the first embodiment.

As in the first embodiment, this embodiment includes a reservoir 110 that carries a casing 130, the reservoir and the casing being capable of mutual rotation. Its principles of operation and construction are much the same as those of the first embodiment.

The reservoir 110 has two interconnected components: a base 180 and a cover 182. The cover 182 is made of a transparent plastic material. The base 180 carries the dispenser 124, and its dip tube 138 extends into the cover 182. When in the closed condition, the cover 182 projects from the casing 130 such that the contents of the reservoir 110 can be seen through it. The bosses 126 project from the base 180.

As will be seen from the figures, the casing 130 of this embodiment has a different shape than that of the first embodiment. This is a predominantly aesthetic choice.

Typical dimensions of a container embodying the invention are an overall thickness of 19.5 mm, a radius of the reservoir 110 of 25.5 mm and a radius of the casing 130 of 27.4 mm.

Surface decoration can be applied to the container. For example, the container could be made to accord with a corporate identity, or it may simply be aesthetic. This can be printed or done by transfer. Also, decorative items such as rhinestones could be applied to achieve a desired appearance.

In alternative embodiments, the reservoir contains a liquid product and a propellant gas under pressure, and the dispenser includes a valve and a spray head—a so-called aerosol container.

In UK patent application GB-A-2 431 909 and International Patent Application WO2007/052051 the present applicants disclosed a container for products such as cosmetic preparations that can be worn about the person by interconnecting a container body with one of several alternative mounting components. The various mounting components can attach to garments or be otherwise carried about by a person. Several such mounting components are seen at 70 in FIG. 11. A recess 72 is provided in the rear wall of the casing 130 into which one of the mounting components 70 can be received, as described in the documents mentioned above. This arrangement can be applied to all of the embodiments described above. This allows a container embodying the invention to be carried conveniently and under almost any circumstances.

The invention claimed is:

1. A container for a liquid comprising:

a. a reservoir having a front wall, a rear wall, a side wall connecting the front wall and the rear wall, and a neck extending from the side wall, through which liquid passes through the neck and out of an internal space of the reservoir, the front wall and the rear wall includes a first peripheral region shaped as a semi-circle extending slightly more than 180° and a second peripheral region having a slightly convex shape, the side wall includes an arcuate region and a convex region;

b. a dispenser carried on the neck of the reservoir, the dispenser dispenses a quantity of liquid from the reservoir on operation of a trigger, c. a casing having spaced front and rear walls and a peripheral wall connecting the front wall and the rear wall of the casing, the front wall and the rear wall of the casing includes a peripheral region shaped as a semi-circle and a second peripheral region shaped as a bell extending outward, the side wall includes an arcuate region and a convex region the reservoir slides between the front wall and the rear wall of the casing, an outer surface of the front wall of the reservoir being adjacent to an inner face of the front wall of the casing and an outer surface of the rear wall of the reservoir being adjacent to an inner face of the rear wall of the casing; and d. the front and rear walls of the reservoir comprise a boss, the front wall of the casing includes an aperture, the rear wall of the casing includes a slot and a rib on each side of the slot, the boss of the rear wall of the reservoir slides into the slot of the rear wall of the casing, the boss of the front wall of the reservoir passes through and is retained into the aperture of the front wall of the casing;

e. the casing and the reservoir rotates with respect to each other through 180° between a closed condition and an open condition:

i. in the closed condition the trigger is entirely enclosed within the casing preventing access to the trigger and the reservoir predominantly projects from the casing, ii. the reservoir includes at least one wall of a transparent or a semi-transparent material, through which the contents of the reservoir can be inspected when the container is in the closed condition, and iii. in the open condition the trigger projects from the casing such that it can be operated and a majority of the reservoir is enclosed within the walls of the casing.

2. The container according to claim 1 wherein the reservoir is made entirely of transparent material.

3. The container according to claim 1, wherein when in the closed condition, the container presents an approximately circular in peripheral shape.

4. The container according to claim 1, wherein the dispenser is a trigger-operated pump.

5. The container according to claim 1, wherein the reservoir contains a liquid product and a propellant gas under pressure, and the dispenser includes a valve and a spray head.

6. The container according to claim 1, wherein the dispenser is a metered-dispense type dispenser.

7. The container according to claim 1, further comprising detents to retain the container in its open and/or its closed condition.

8. The container according to claim 1, wherein the dispenser is permanently attached to the container.

9. The container according to claim 1, wherein the dispenser is releasably attached to the container.

10. The container according to claim 9, wherein the dispenser is attached to the container by a screw thread.

11. The container according to claim 1, wherein the dispenser acts as a closure for the container.

12. A container according to claim 1, further comprising a plurality of mounting components, any of which can be releasably connected to the container, the mounting components being suitable for connection with a garment.

13. The container according to claim 1, wherein the boss of the front wall of the reservoir is visible through the aperture of the front wall of the casing.

14. A packaged product comprising a container, the container comprising:

a. a reservoir having a front wall, a rear wall, a side wall connecting the front wall and the rear wall, and a neck extending from the side wall, through which liquid passes through the neck and out of an internal space of the reservoir, the front wall and the rear wall includes a first peripheral region shaped as a semi-circle extending slightly more than 180° and a second peripheral region having a slightly convex shape, the side wall includes an arcuate region and a convex region;

b. a dispenser carried on the neck of the reservoir, the dispenser dispenses a quantity of liquid from the reservoir on operation of a trigger, c. a casing having spaced front and rear walls and a peripheral wall connecting the front wall and the rear wall of the casing, the front wall and the rear wall of the casing includes a peripheral region shaped as a semi-circle and a second peripheral region having shaped as a bell extending outward, the side wall includes an arcuate region and a convex region the reservoir slides between the front wall and the rear wall of the casing, an outer surface of the front wall of the reservoir being adjacent to an inner face of the front wall of the casing and an outer surface of the rear wall of the reservoir being adjacent to an inner face of the rear wall of the casing; and d. the front and rear walls of the reservoir comprise a boss, the front wall of the casing includes an aperture, the rear wall of the casing includes a slot and a rib on each side of the slot, the boss of the rear wall of the reservoir slides into the slot of the rear wall of the casing, the boss of the front wall of the reservoir passes through and is retained into the aperture of the front wall of the casing;

e. the casing and the reservoir rotates with respect to each other through 180° between a closed condition and an open condition:

i. in the closed condition the trigger is entirely enclosed within the casing preventing access to the trigger and the reservoir predominantly projects from the casing, ii. the reservoir includes at least one wall of a transparent or a semi-transparent material, through which the contents of the reservoir can be inspected when the container is in the closed condition, and iii. in the open condition the trigger projects from the casing such that it can be operated and a majority of the reservoir is enclosed within the walls of the casing.

15. The packaged product according to claim 14, wherein the volume of liquid within the container is less than 50 ml.

16. The packaged product according to claim 15, wherein the volume of liquid within the container is one of 5 ml, 10 ml or 15 ml.

17. The packaged product according to claim 14, wherein the liquid is a product for personal use.

18. The packaged product according to claim 17, wherein the liquid is a perfume for personal use.

* * * * *